(12) United States Patent
Nakai et al.

(10) Patent No.: US 11,726,066 B2
(45) Date of Patent: Aug. 15, 2023

(54) INSPECTION DEVICE AND INSPECTION METHOD

(71) Applicants: KABUSHIKI KAISHA TOSHIBA, Tokyo (JP); TOSHIBA INFRASTRUCTURE SYSTEMS & SOLUTIONS CORPORATION, Kawasaki (JP)

(72) Inventors: Yutaka Nakai, Yokohama Kanagawa (JP); Tomio Ono, Yokohama Kanagawa (JP); Noriko Yamamoto, Yokohama Kanagawa (JP); Kazuhiro Itsumi, Tokyo (JP)

(73) Assignees: KABUSHIKI KAISHA TOSHIBA, Tokyo (JP); TOSHIBA INFRASTRUCTURE SYSTEMS & SOLUTIONS CORPORATION, Tokyo (JP)

( * ) Notice: Subject to any disclaimer, the term of this patent is extended or adjusted under 35 U.S.C. 154(b) by 229 days.

(21) Appl. No.: 17/192,024

(22) Filed: Mar. 4, 2021

(65) Prior Publication Data
US 2022/0065820 A1 Mar. 3, 2022

(30) Foreign Application Priority Data
Sep. 3, 2020 (JP) ................. 2020-148073

(51) Int. Cl.
*G01N 29/11* (2006.01)
(52) U.S. Cl.
CPC ....... *G01N 29/11* (2013.01); *G01N 2291/048* (2013.01); *G01N 2291/102* (2013.01)
(58) Field of Classification Search
CPC ............. G01N 29/11; G01N 2291/048; G01N 2291/102; G01N 29/223; G01N 29/343; G01N 29/043; G01N 29/32
See application file for complete search history.

(56) References Cited

U.S. PATENT DOCUMENTS

| 6,407,964 B1 * | 6/2002 | Hornung ............. G01N 29/221 367/138 |
| 2004/0150155 A1 | 8/2004 | Okitsu |

(Continued)

FOREIGN PATENT DOCUMENTS

| CN | 104644211 A | 5/2015 |
| DE | 10 2007 045 494 A1 | 4/2008 |

(Continued)

OTHER PUBLICATIONS

U.S. Non-Final Office Action on U.S. Appl. No. 17/012,338 dated Jun. 30, 2022 (16 pages).

(Continued)

*Primary Examiner* — Alexander A Mercado
*Assistant Examiner* — John M Royston
(74) *Attorney, Agent, or Firm* — Foley & Lardner LLP

(57) ABSTRACT

According to one embodiment, an inspection device includes a transmitter, a receiver, and a supporter. The transmitter is configured to transmit a first ultrasonic wave including burst waves having a first period Tp. The receiver on which the first ultrasonic wave is incident is configured to output a signal corresponding to the incident first ultrasonic wave. The supporter is provided between the transmitter and the receiver. The supporter is configured to support an inspection object. The first period Tp (s), a distance Dx (m), and a velocity vx (m/s) satisfy $2Dx/((n+1)\cdot vx) < Tp < 2Dx/(n \cdot vx)$. n is 1 or 2. The distance Dx is a shorter distance of first and second distances. The first distance is a distance along a first direction between the transmitter and the supporter. The second distance is a distance along the first direction between the supporter and the receiver.

19 Claims, 4 Drawing Sheets

(56) References Cited

U.S. PATENT DOCUMENTS

| | | | |
|---|---|---|---|
| 2009/0184830 A1 | 7/2009 | Watabe et al. | |
| 2009/0310981 A1 | 12/2009 | Ishida | |
| 2009/0310992 A1 | 12/2009 | Iwasa et al. | |
| 2011/0142459 A1 | 6/2011 | Aoki | |
| 2012/0061901 A1 | 3/2012 | Yamamoto | |
| 2012/0095345 A1 | 4/2012 | Nakazawa | |
| 2012/0294636 A1 | 11/2012 | Ishida | |
| 2013/0224791 A1 | 8/2013 | Taft et al. | |
| 2014/0216158 A1 | 8/2014 | Sanabria Martin et al. | |
| 2014/0269205 A1 | 9/2014 | Blair | |
| 2014/0377450 A1* | 12/2014 | Knorr | G01B 17/02 427/9 |
| 2015/0037053 A1 | 2/2015 | Ishida | |
| 2017/0017181 A1 | 1/2017 | Watanabe et al. | |
| 2017/0108473 A1 | 4/2017 | Bestebreurtje | |
| 2018/0181045 A1 | 6/2018 | Watanabe et al. | |
| 2019/0088710 A1 | 3/2019 | Itsumi | |
| 2019/0283995 A1 | 9/2019 | Itsumi | |
| 2019/0353480 A1 | 11/2019 | Osawa et al. | |
| 2020/0080974 A1 | 3/2020 | Itsumi | |
| 2020/0240843 A1 | 7/2020 | Kanai et al. | |
| 2021/0123796 A1 | 4/2021 | Itsumi et al. | |

FOREIGN PATENT DOCUMENTS

| | | |
|---|---|---|
| JP | 2000-025988 A | 1/2000 |
| JP | 2001-351141 A | 12/2001 |
| JP | 3860126 B2 | 12/2006 |
| JP | 2012-063276 A | 3/2012 |
| JP | 2013-217926 A | 10/2013 |
| JP | 2014-186349 A | 10/2014 |
| JP | 2019-057804 A | 4/2019 |
| JP | 2019-082484 A | 5/2019 |
| JP | 2019-108230 A | 7/2019 |
| JP | 2019-158772 A | 9/2019 |
| JP | 6581712 B2 | 9/2019 |
| JP | 2020-027953 A | 2/2020 |
| JP | 2020-043476 A | 3/2020 |
| JP | 2020-122661 A1 | 8/2020 |
| JP | 2021-067543 A | 4/2021 |
| KR | 20100072539 A | 7/2010 |
| WO | WO-2007/132671 A | 11/2007 |
| WO | WO-2008/130111 A1 | 10/2008 |

OTHER PUBLICATIONS

U.S. Notice of Allowance on U.S. Appl. No. 17/012,338 dated Nov. 10, 2022 (8 pages).

U.S. Appl. No. 17/012,338, filed Sep. 4, 2020, Itsumi.

U.S. Notice of Allowance on U.S. Appl. No. 17/012,338 dated Mar. 3, 2023 (8 pages).

U.S. Notice of Allowance on U.S. Appl. No. 17/012,338 dated Jan. 19, 2023 (4 pages).

* cited by examiner

INSPECTION DEVICE AND INSPECTION METHOD

CROSS-REFERENCE TO RELATED APPLICATIONS

This application is based upon and claims the benefit of priority from Japanese Patent Application No. 2020-148073, filed on Sep. 3, 2020; the entire contents of which are incorporated herein by reference.

FIELD

Embodiments described herein generally relate to an inspection device and an inspection method.

BACKGROUND

For example, there is an inspection device that uses an ultrasonic wave or the like. It is desirable to increase the detection sensitivity.

DETAILED DESCRIPTION

Figure 1:
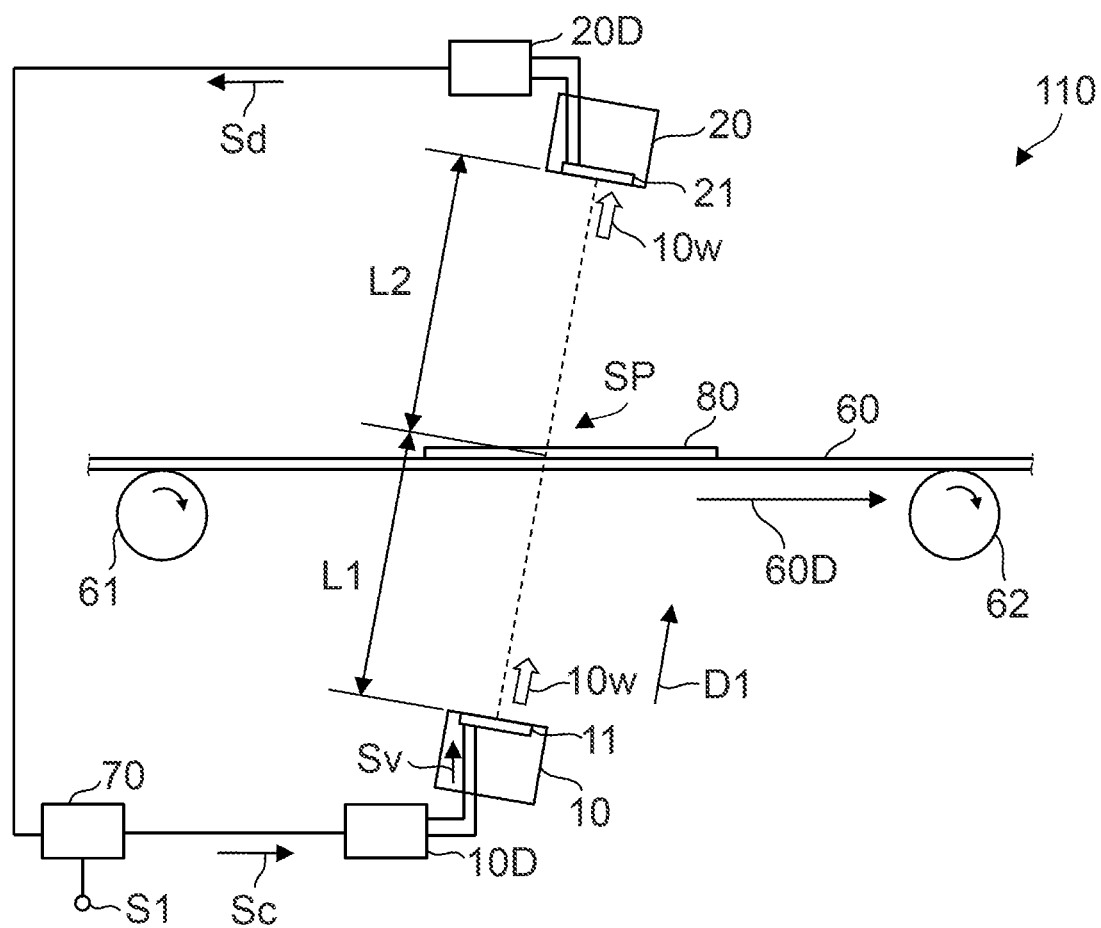
FIG. 1 is a schematic side view illustrating an inspection device according to a first embodiment.

According to one embodiment, an inspection device includes a transmitter, a receiver, and a supporter. The transmitter is configured to transmit a first ultrasonic wave including a plurality of burst waves having a first period Tp. The receiver on which the first ultrasonic wave is incident is configured to output a signal corresponding to the incident first ultrasonic wave. The supporter is provided between the transmitter and the receiver. The supporter is configured to support an inspection object. The first period Tp (s), a distance Dx (m), and a velocity vx (m/s) satisfy $2Dx/((n+1) \cdot vx) < Tp < 2Dx/(n \cdot vx)$. n is 1 or 2. The distance Dx is a shorter distance of a first distance and a second distance. The first distance is a distance along a first direction between the transmitter and the supporter. The first direction is from the transmitter toward the receiver. The second distance is a distance along the first direction between the supporter and the receiver. The velocity vx is a propagation velocity of the first ultrasonic wave in space between the transmitter and the receiver.

According to one embodiment, an inspection method can include transmitting, from a transmitter toward an inspection object. A first ultrasonic wave includes a plurality of burst waves having a first period Tp. The method can include inspecting the inspection object by using a receiver to receive the first ultrasonic wave after the first ultrasonic wave passes through the inspection object. The first period Tp (s), a distance Dx (m), and a velocity vx (m/s) satisfy $2Dx/((n+1) \cdot vx) < Tp < 2Dx/(n \cdot vx)$. n is 1 or 2. The distance Dx is a shorter distance of a first distance and a second distance. The first distance is a distance along a first direction between the inspection object and the transmitter. The first direction is from the transmitter toward the receiver. The second distance is a distance along the first direction between the inspection object and the receiver. The velocity vx is a propagation velocity of the first ultrasonic wave in space between the transmitter and the receiver.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic side view illustrating an inspection device according to a first embodiment.

As shown in FIG. 1, the inspection device 110 according to the embodiment includes a transmitter 10, a receiver 20, and a supporter 60.

The transmitter 10 is configured to transmit a first ultrasonic wave 10w. The first ultrasonic wave 10w includes multiple burst waves having a first period Tp. Examples of the first ultrasonic wave 10w are described below.

The first ultrasonic wave 10w is incident on the receiver 20. In addition to a direct wave of the first ultrasonic wave 10w that is emitted from the transmitter 10, the first ultrasonic wave 10w that is incident on the receiver 20 may include reflected waves of the first ultrasonic wave 10w reflected by various members. The receiver 20 is configured to output a signal Sd that corresponds to the first ultrasonic wave 10w incident on the receiver 20.

The supporter 60 is located between the transmitter 10 and the receiver 20. The supporter 60 is configured to support an inspection object 80.

In the example, the supporter 60 is fed by a first feeder 61 (e.g., a roller) and a second feeder 62 (e.g., a roller). The inspection object 80 is placed on the supporter 60. The inspection object 80 is fed along a feed direction 60D as the supporter 60 is fed.

The inspection object 80 is, for example, a banknote, etc. The inspection object may be a document such as a security, etc. The material of the inspection object 80 is arbitrary.

For example, the transmitter 10 includes a first membrane portion 11 that is deformable. The first membrane portion 11 emits the first ultrasonic wave 10w. A transmitting circuit 10D is connected to the transmitter 10. The first membrane portion 11 is deformed by a drive signal Sv from the transmitting circuit 10D and emits the first ultrasonic wave 10w. For example, the deformation of the first membrane portion 11 is generated by a piezoelectric element, etc.

For example, the receiver 20 includes a second membrane portion 21 that is deformable. The second membrane portion 21 is deformed by the received first ultrasonic wave 10w. The signal Sd is obtained according to the deformation of the second membrane portion 21. For example, the deformation of the second membrane portion 21 is converted into an electrical signal by a piezoelectric element, etc.

For example, a controller 70 may be provided. For example, the controller 70 supplies a control signal Sc to the transmitting circuit 10D. The transmitting circuit 10D causes the first membrane portion 11 to deform according to the control signal Sc. Thereby, the first ultrasonic wave 10w is emitted from the transmitter 10. For example, the first ultrasonic wave 10w that is emitted from the transmitter 10 passes through the inspection object 80 and is incident on the receiver 20. The first ultrasonic wave 10w that is incident on the receiver 20 changes according to the state of the inspection object 80. The changed first ultrasonic wave 10w is received by the receiver 20. The signal Sd that is output from the receiver 20 reflects the state of the inspection object 80. For example, the signal Sd is supplied to the controller 70. The controller 70 processes the signal Sd and is configured to output an inspection signal 51. The inspection signal 51 includes information relating to the inspection result of the inspection object 80.

The inspection device 110 may include the transmitting circuit 10D and a receiving circuit 20D. The inspection device 110 may include the controller 70. The controller 70 may include an electrical circuit (e.g., a computer, etc.) such as a CPU (Central Processing Unit), etc.

The first ultrasonic wave 10w that is emitted from the transmitter 10 is controlled by the drive signal Sv from the transmitting circuit 10D. For example, the first period Tp of the first ultrasonic wave 10w can be controlled by the drive signal Sv. For example, the duration of one of the multiple burst waves can be controlled by the drive signal Sv. The drive signal Sv from the transmitting circuit 10D may be controlled by the control signal Sc from the controller 70. In such a case, for example, the first period Tp of the first ultrasonic wave 10w may be controlled by the controller 70. For example, the duration of one of the multiple burst waves may be controlled by the controller 70.

According to the embodiment, the first ultrasonic wave 10w is appropriately controlled. The detection sensitivity can be increased thereby.

As shown in FIG. 1, the direction from the transmitter 10 toward the receiver 20 is taken as a first direction D1. The first direction D1 crosses the feed direction 60D. The first direction D1 may be oblique to the feed direction 60D.

The distance along the first direction D1 between the transmitter 10 and the supporter 60 is taken as a first distance L1. The distance along the first direction D1 between the supporter 60 and the receiver 20 is taken as a second distance L2. For example, the first distance L1 is the distance along the first direction D1 between the first membrane portion 11 and the supporter 60. For example, the second distance L2 is the distance along the first direction D1 between the supporter 60 and the second membrane portion 21.

When the thickness (the length along a direction perpendicular to the feed direction 60D) of the inspection object 80 is sufficiently thin, the first distance L1 can be considered to be the distance between the transmitter 10 and the inspection object 80. The second distance L2 can be considered to be the distance between the inspection object 80 and the receiver 20.

The second distance L2 may be equal to or different from the first distance L1. A distance Dx is taken to be the shorter distance of the first distance L1 and the second distance L2. When the second distance L2 is equal to the first distance L1, the distance Dx corresponds to the first distance L1 (or the second distance L2). When the second distance L2 is greater than the first distance L1, the distance Dx corresponds to the first distance L1. When the second distance L2 is less than the first distance L1, the distance Dx corresponds to the second distance L2.

According to the embodiment, the first period Tp (s), the distance Dx (m), and the velocity vx (m/s) satisfy Formula (1):

$$2Dx/((n+1)\cdot vx) < Tp < 2Dx/(n\cdot vx) \qquad (1)$$

In Formula (1), n is 1 or 2. As described below, the detection sensitivity can be increased thereby. To simplify the description hereinbelow, the second distance L2 is taken to be greater than the first distance L1.

FIGS. 2A to 2F are schematic views illustrating the inspection device according to the first embodiment.

Figure 2A:
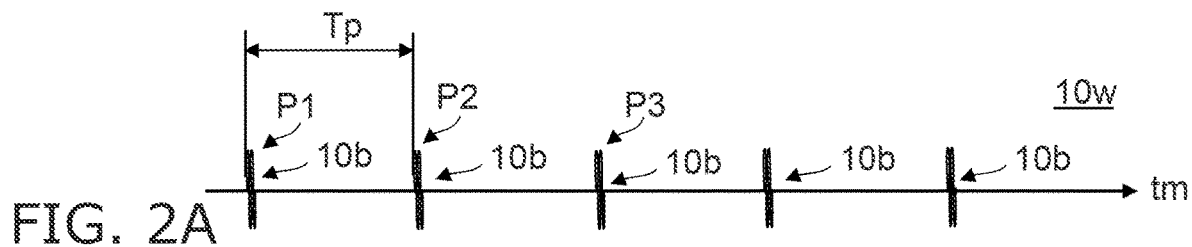
FIGS. 2A to 2F are schematic views illustrating the inspection device according to the first embodiment.

FIGS. 2A to 2F correspond to when the pulse width (the pulse duration) of the multiple burst waves included in the first ultrasonic wave 10w is relatively short. In these drawings, the horizontal axis is a time tm. FIG. 2A illustrates the first ultrasonic wave 10w emitted from the transmitter 10. As shown in FIG. 2A, the first ultrasonic wave 10w includes multiple burst waves 10b. The period of the multiple burst waves 10b is the first period Tp. The multiple burst waves 10b include, for example, a first pulse wave P1, a second pulse wave P2, a third pulse wave P3, etc.

Figure 2B:
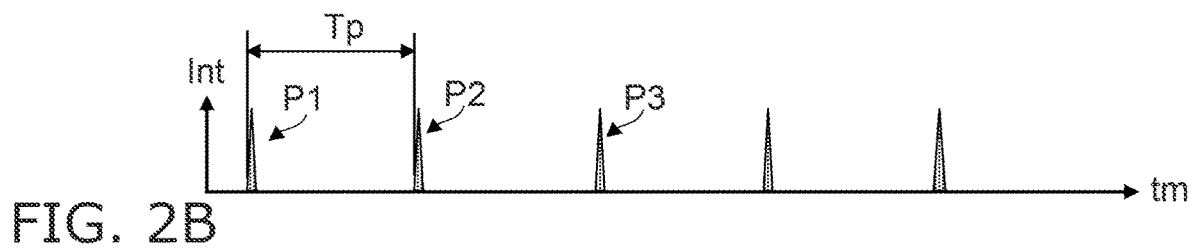
Figure 2C:
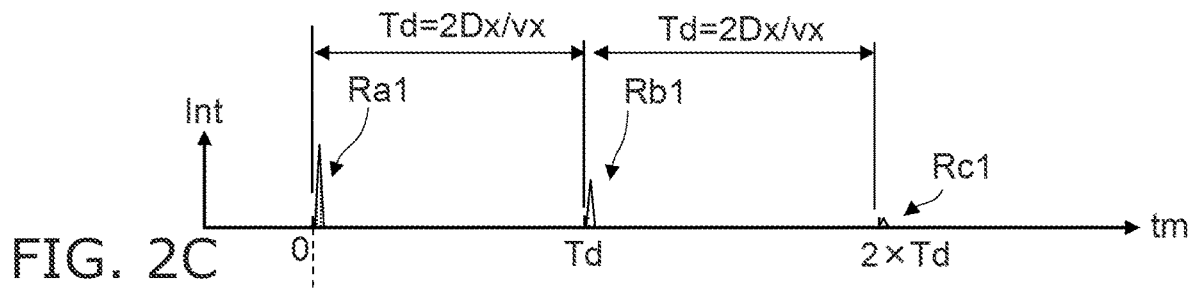
Figure 2D:
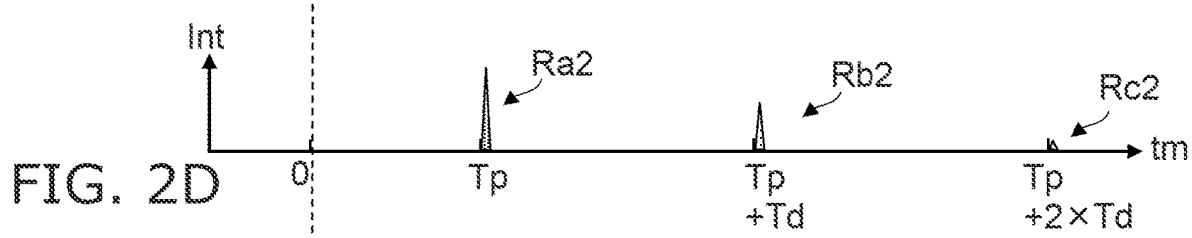
Figure 2E:
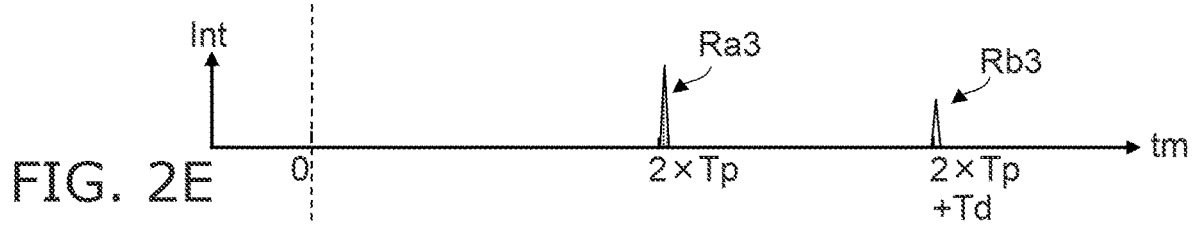

FIG. 2B schematically illustrates an intensity Int of the first ultrasonic wave 10w emitted from the transmitter 10. A high intensity Int that corresponds to the first pulse wave P1, the second pulse wave P2, and the third pulse wave P3 is generated. FIGS. 2C to 2E schematically illustrate the intensity Int of the first ultrasonic wave 10w received by the receiver 20. The first pulse wave P1 and pulse waves that correspond to the first pulse wave P1 are extracted in FIG. 2C. The second pulse wave P2 and pulse waves that correspond to the second pulse wave P2 are extracted in FIG. 2D. The third pulse wave P3 and pulse waves that correspond to the third pulse wave P3 are extracted in FIG. 2E.

As shown in FIG. 2C, pulse waves Ra1, Rb1, Rc1, etc., are observed at the receiver 20. The intensity Int of the pulse wave Rb1 is less than the intensity Int of the pulse wave Ra1. The intensity Int of the pulse wave Rc1 is less than the intensity Int of the pulse wave Rb1. For example, the pulse wave Ra1 corresponds to the direct wave of the first pulse wave P1. For example, the pulse waves Rb1 and Rc1 correspond to reflected waves of the first pulse wave P1. For example, the pulse wave Rb1 corresponds to a first reflected wave of the first pulse wave P1. For example, the pulse wave Rc1 corresponds to a second reflected wave of the first pulse wave P1.

The direct wave is the signal component from the transmitter 10 that reaches the receiver 20 via supporter 60 in the least amount of time. The direct wave reaches the receiver 20 without detouring due to multiple reflections, etc. The direct wave includes accurate information of the transmittance of the inspection object 80, etc. The detection sensitivity can be increased by receiving a direct wave in which the effects of noise are suppressed.

In the process of the reflected wave reaching the receiver 20 from the transmitter 10 via the supporter 60, for example, the reflected wave reaches the receiver 20 after being reflected by the transmitter 10, the supporter 60, the receiver 20, or other members. For example, after the first ultrasonic wave 10w reaches the supporter 60 from the transmitter 10, a component of a portion of the first ultrasonic wave 10w that is reflected by the supporter 60 returns to the transmitter 10. The first ultrasonic wave 10w that returns to the transmitter 10 is reflected by the transmitter 10, reaches the supporter 60, and subsequently reaches the receiver 20. Such a first ultrasonic wave 10w corresponds to a reflected wave. The reflected wave is temporally delayed from the direct wave when reaching the receiver 20.

The reflected wave includes transmission and reflection information other than the inspection object 80. There are also cases where multiple reflected waves are superimposed. The reflected waves are noise components in the detection of the inspection object 80. Accordingly, for example, it is desirable to suppress the temporal superimposition of the direct wave and the reflected waves. For example, it is desirable for the direct wave and the reflected waves not to be excessively superimposed.

When the second distance L2 is greater than the first distance L1, for example, it is considered that the pulse wave Rb1 corresponds to the result of one round trip reflection of the first ultrasonic wave 10w between the transmitter 10 and the supporter 60. In such a case, the increase amount of the propagation distance of the first ultrasonic wave 10w is 2 times the distance Dx. For example, it is considered that the pulse wave Rc1 corresponds to the result of two round trip reflections of the first ultrasonic wave 10w between the transmitter 10 and the supporter 60. In such a case, the increase amount of the propagation distance of the first ultrasonic wave 10w is 4 times the distance Dx.

As shown in FIG. 2C, a time Td between the pulse wave Ra1 and the pulse wave Rb1 corresponds to 2Dx/vx. The time Td between the pulse wave Rb1 and the pulse wave Rc1 corresponds to 2Dx/vx. When the time tm at the start of the pulse wave Ra1 is a reference "0", the time tm of the start of the pulse wave Rb1 is the time Td. The time tm of the start of the pulse wave Rc1 is 2 times the time Td.

As shown in FIG. 2D, pulse waves Ra2, Rb2, Rc2, etc., are observed at the receiver 20. The intensity Int of the pulse wave Rb2 is less than the intensity Int of the pulse wave Ra2. The intensity Int of the pulse wave Rc2 is less than the intensity Int of the pulse wave Rb2. For example, the pulse wave Ra2 corresponds to the direct wave of the second pulse wave P2. For example, the pulse waves Rb2 and Rc2 correspond to reflected waves of the second pulse wave P2. For example, the pulse wave Rb2 corresponds to a first reflected wave of the second pulse wave P2. For example, the pulse wave Rc2 corresponds to the second reflected wave of a second pulse wave P2.

As shown in FIG. 2E, pulse waves Ra3, Rb3, etc., are observed at the receiver 20. The intensity Int of the pulse wave Rb3 is less than the intensity Int of the pulse wave Ra3. For example, the pulse wave Ra3 corresponds to the direct wave of the third pulse wave P3. For example, the pulse wave Rb3 corresponds to a reflected wave of the third pulse wave P3. For example, the pulse wave Rb3 corresponds to a first reflected wave of the third pulse wave P3.

Figure 2F:
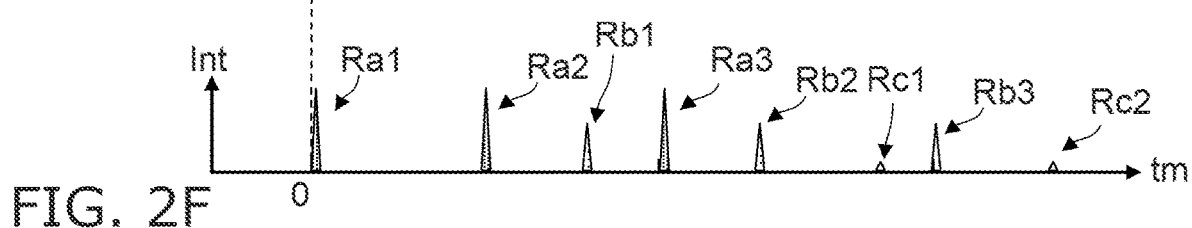

The pulse waves of FIGS. 2C to 2D are overlaid in FIG. 2F. In the example as shown in FIG. 2F, the direct waves of the pulse waves Ra1, Ra2, Ra3, etc., do not overlap the other pulse waves (reflected waves). The effects of the reflected waves on the direct waves are suppressed thereby. When the reflected waves overlap the direct waves, there are cases where the reflected waves become noise; the signal strengths of the direct waves change; and the detection sensitivity decreases. According to the embodiment, the effects of the reflected waves on the direct waves can be suppressed. Thereby, an inspection device can be provided in which the detection sensitivity can be increased.

In the example shown in FIGS. 2C to 2E, the pulse wave Rb1 is after the pulse wave Ra2 and before the pulse wave Ra3. The time tm of the start of the pulse wave Rb1 is the time Td. The time tm of the start of the pulse wave Ra2 corresponds to the time tm of the first period Tp when referenced to "0". The time tm of the start of the pulse wave Ra3 corresponds to the time tm of 2 times the first period Tp when referenced to "0".

For example, when Tp<Td, the pulse wave Rb1 is after the pulse wave Ra2. For example, when Td<2Tp, i.e., when Td/2<Tp, the pulse wave Rb1 is before the pulse wave Ra3. As described above, the time Td corresponds to 2Dx/vx. Accordingly, when "Dx/vx<Tp", the pulse wave Rb1 is before the pulse wave Ra3. When "Tp<2Dx/vx", the pulse wave Rb1 is after the pulse wave Ra2. By such conditions, for example, the effects of the reflected waves on the direct waves can be suppressed. Thereby, an inspection device can be provided in which the detection sensitivity can be increased.

The pulse wave Rb1 may arrive after the pulse wave Ra3. In such a case, when Td<3Tp, the pulse wave Rb1 is before the other pulse waves; and when 2Tp<Td, the pulse wave Rb1 is after the pulse wave Ra3. By generalizing, the condition of Formula (1) is obtained:

$$2Dx/((n+1)\cdot vx) < Tp < 2Dx/(n \cdot vx) \tag{1}$$

n is an integer not less than 1. FIGS. 2A to 2F correspond to when n is 1.

An example when the pulse widths (the pulse durations) of the multiple burst waves 10b are relatively long will now be described.

FIGS. 3A to 3F are schematic views illustrating the inspection device according to the first embodiment.

Figure 3A:
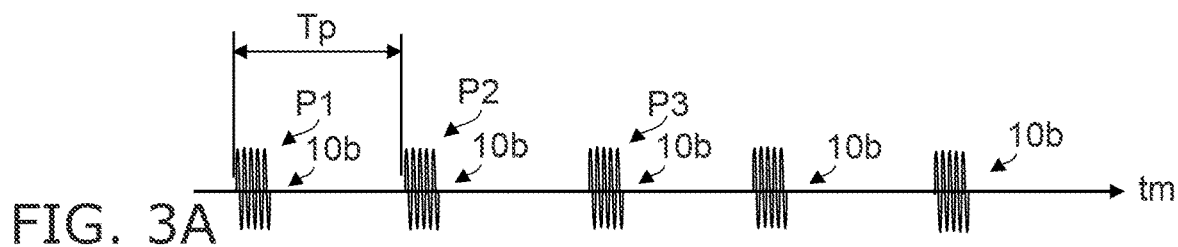
FIGS. 3A to 3F are schematic views illustrating the inspection device according to the first embodiment.
Figure 3B:
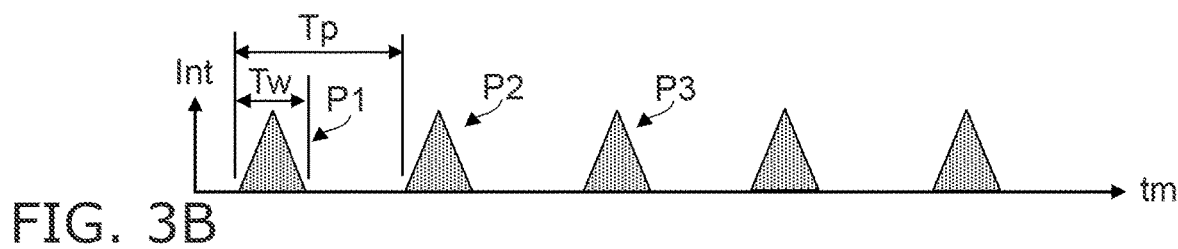

In FIGS. 3A to 3F, the horizontal axis is the time tm. FIG. 3A illustrates the first ultrasonic wave 10w emitted from the transmitter 10. As shown in FIG. 3A, the first ultrasonic wave 10w includes the multiple burst waves 10b. The period of the multiple burst waves 10b is the first period Tp. One (each) of the multiple burst waves 10b has a first duration Tw. In such a case as well, the multiple burst waves 10b include, for example, the first pulse wave P1, the second pulse wave P2, the third pulse wave P3, etc.

Figure 3C:
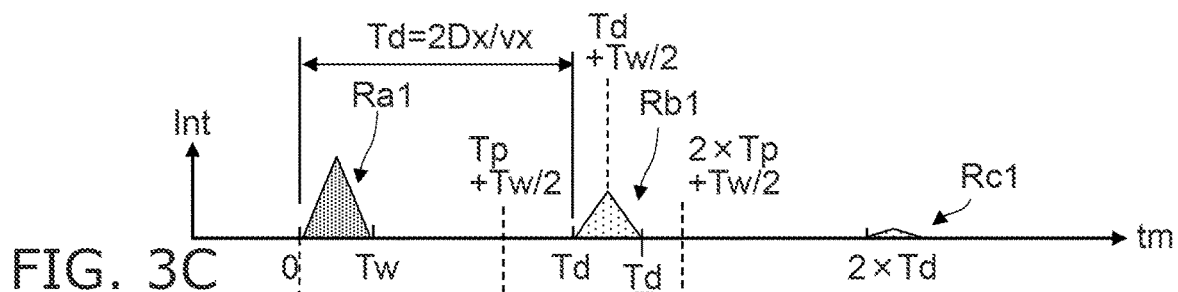
Figure 3D:
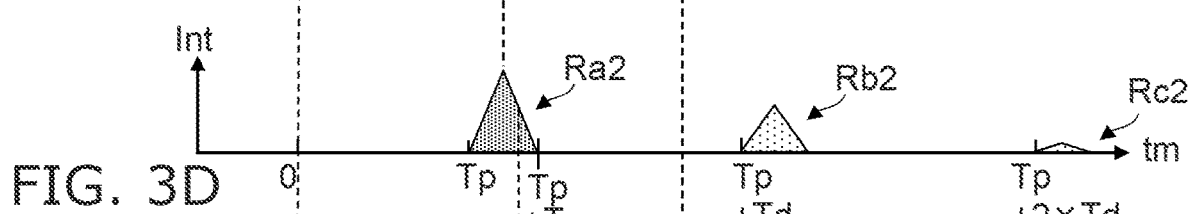

For example, it is favorable for the time Td of the start of the pulse wave Rb1 illustrated in FIG. 3C to be after the time of the peak (Tp+Tw/2) of the pulse wave Rat illustrated in FIG. 3D. For example, it is favorable for "(Tp+Tw/2)<Td". This condition corresponds to "Tw<(Td−Tp)×2", and corresponds to "Tw<(2Dx/vx−Tp)×2".

In other words, according to the embodiment, it is favorable for the first period Tp (s), the distance Dx (m), the velocity vx (m/s), and the first duration Tw (s) to satisfy Formula (2):

$$Tw < (2Dx/vx - Tp) \times 2 \tag{2}$$

The effects of the reflected waves on the direct waves can be further suppressed thereby.

Figure 3E:
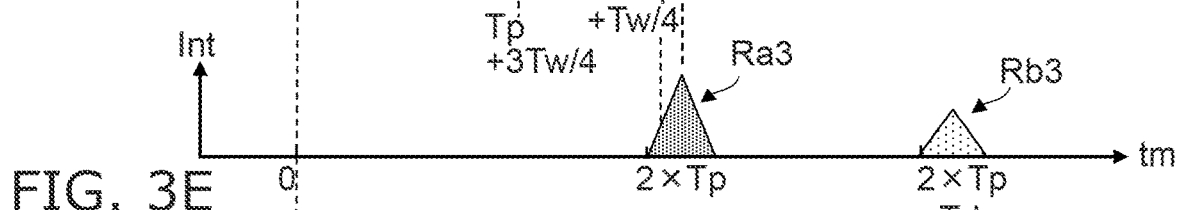

For example, it is favorable for the time "Td+Tw" of the end of the pulse wave Rb1 illustrated in FIG. 3C to be before the time of the peak (2×Tp+Tw/2) of the pulse wave Ra3 illustrated in FIG. 3E. For example, it is favorable for "(Td+Tw)<(2Tp+Tw/2)". This condition corresponds to "Tw<(2Tp−Td)×2", and corresponds to "Tw<(2Tp−2Dx/vx)×2".

In other words, according to the embodiment, it is favorable for the first period Tp (S), the distance Dx (m), the velocity vx (m/s), and the first duration Tw (s) to satisfy Formula (3):

$$Tw < (2Tp - 2Dx/vx) \times 2 \tag{3}$$

The effects of the reflected waves on the direct waves can be further suppressed thereby.

For example, it is favorable for the time Td of the start of the pulse wave Rb1 illustrated in FIG. 3C to be after the time of the midpoint between the time of the peak (Tp+Tw/2) and the time of the end (Tp+Tw) of the pulse wave Rat illustrated in FIG. 3D. The time of the midpoint corresponds to (Tp+3Tw/4). For example, it is favorable for "(Tp+3Tw/4) <Td". This condition corresponds to "Tw<(Td−Tp)×4/3", and corresponds to "Tw<(2Dx/vx−Tp)×4/3".

In other words, according to the embodiment, it is favorable for the first period Tp (s), the distance Dx (m), the velocity vx (m/s), and the first duration Tw (s) to satisfy Formula (4):

$$Tw<(2Dx/vx-Tp)\times 4/3 \quad (4)$$

The effects of the reflected waves on the direct waves can be further suppressed thereby.

For example, it is favorable for the time "Td+Tw" of the end of the pulse wave Rb1 illustrated in FIG. 3C to be before the time of the midpoint between the time of the start and the time of the peak (2×Tp+Tw/2) of the pulse wave Ra3 illustrated in FIG. 3E. The time of the midpoint corresponds to (2Tp+Tw/4). For example, it is favorable for "(Td+Tw) <(2Tp+Tw/4)". This condition corresponds to "Tw<(2Tp−Td)×4/3", and corresponds to "Tw<(2Tp−2Dx/vx)×4/3".

In other words, according to the embodiment, it is favorable for the first period Tp (s), the distance Dx (m), the velocity vx (m/s), and the first duration Tw (s) to satisfy Formula (5):

$$Tw<(2Tp-2Dx/vx)\times 4/3 \quad (5)$$

The effects of the reflected waves on the direct waves can be further suppressed thereby.

For example, it is favorable for the time Td of the start of the pulse wave Rb1 illustrated in FIG. 3C to be after the time (Tp+Tw) of the pulse wave Ra2 illustrated in FIG. 3D. For example, it is favorable for "(Tp+Tw)<Td". This condition corresponds to "Tw<(Td−Tp)", and corresponds to "Tw< (2Dx/vx−Tp)".

In other words, according to the embodiment, it is favorable for the first period Tp (s), the distance Dx (m), the velocity vx (m/s), and the first duration Tw (s) to satisfy Formula (6):

$$Tw<(2Dx/vx-Tp) \quad (6)$$

The effects of the reflected waves on the direct waves can be further suppressed thereby.

For example, it is favorable for the time "Td+Tw" of the end of the pulse wave Rb1 illustrated in FIG. 3C to be before the time of the start (2×Tp) of the pulse wave Ra3 illustrated in FIG. 3E. For example, it is favorable for "(Tp+Tw)<2Tp". This condition corresponds to "Tw<(2Tp−Td)", and corresponds to "Tw<(2Tp−2Dx/vx)".

In other words, according to the embodiment, it is favorable for the first period Tp (s), the distance Dx (m), the velocity vx (m/s), and the first duration Tw (s) to satisfy Formula (7):

$$Tw<(2Tp-2Dx/vx) \quad (7)$$

The effects of the reflected waves on the direct waves can be further suppressed thereby.

Figure 3F:
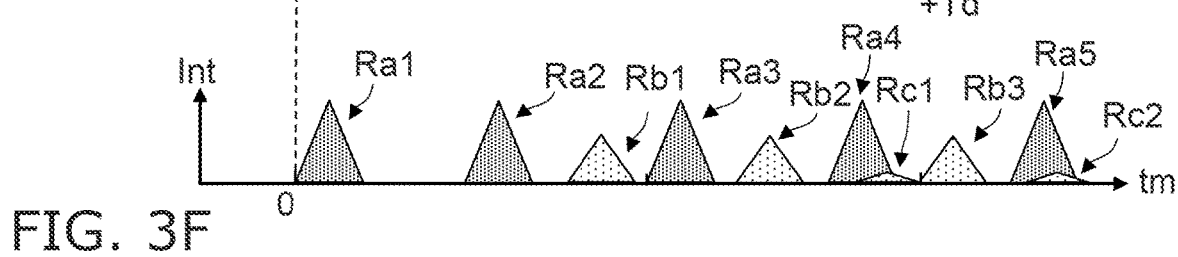

As shown in FIG. 3F, the pulse waves Rc1, Rc2, etc., that are reflected waves may overlap pulse waves Ra4 and Ra5 that are direct waves. The intensities Int of the pulse waves Rc1 and Rc2 are sufficiently low compared to the intensities Int of the pulse waves Ra4 and Ra5. Therefore, even when such reflected waves overlap the direct waves, the effects on the direct waves are small.

For example, the receiving circuit 20D, the controller 70, etc., may include a peak hold circuit. The signal strengths of the direct waves that have high intensities Int can be efficiently detected thereby.

The conditions described above can be generalized similarly according to the position of the pulse wave Rb1 by using n that is an integer not less than 1.

In other words, according to the embodiment, it is favorable for the first period Tp (s), the distance Dx (m), the velocity vx (m/s), and the first duration Tw (s) to satisfy $$Tw<(2Dx/vx-n\times Tp)\times 2.$$

The effects of the reflected waves on the direct waves can be further suppressed thereby.

According to the embodiment, it is favorable for the first period Tp (s), the distance Dx (m), the velocity vx (m/s), and the first duration Tw (s) to satisfy $$Tw<((n+1)Tp-2Dx/vx)\times 2.$$

According to the embodiment, it is favorable for the first period Tp (s), the distance Dx (m), the velocity vx (m/s), and the first duration Tw (ds) to satisfy $$Tw<(2Dx/vx-n\times Tp)\times 4/3.$$

According to the embodiment, it is favorable for the first period Tp (s), the distance Dx (m), the velocity vx (m/s), and the first duration Tw (s) to satisfy $$Tw<((n+1)Tp-2Dx/vx)\times 4/3.$$

According to the embodiment, it is favorable for the first period Tp (s), the distance Dx (m), the velocity vx (m/s), and the first duration Tw (s) to satisfy $$Tw<(2Dx/vx-n\times Tp).$$

According to the embodiment, it is desirable for the first period Tp (s), the distance Dx (m), the velocity vx (m/s), and the first duration Tw (s) to satisfy $$Tw<((n+1)Tp-2Dx/vx).$$

According to the embodiment, it is favorable for n to be 1 or 2. When n is not less than 3, the distance L1 and the distance L2 are excessively long. Therefore, the inspection device 110 becomes large. When the distance is long, the ultrasonic waves are attenuated, and it is difficult to obtain the desired sensitivity. According to the embodiment, because n is 1 or 2, a small and practical inspection device 110 can be provided. Because n is 1 or 2, high sensitivity can be maintained. Thereby, an inspection device can be provided in which the detection sensitivity can be increased. The distance is shorter when n is 1 than when n is 2. The attenuation can be further reduced.

Figure 4:
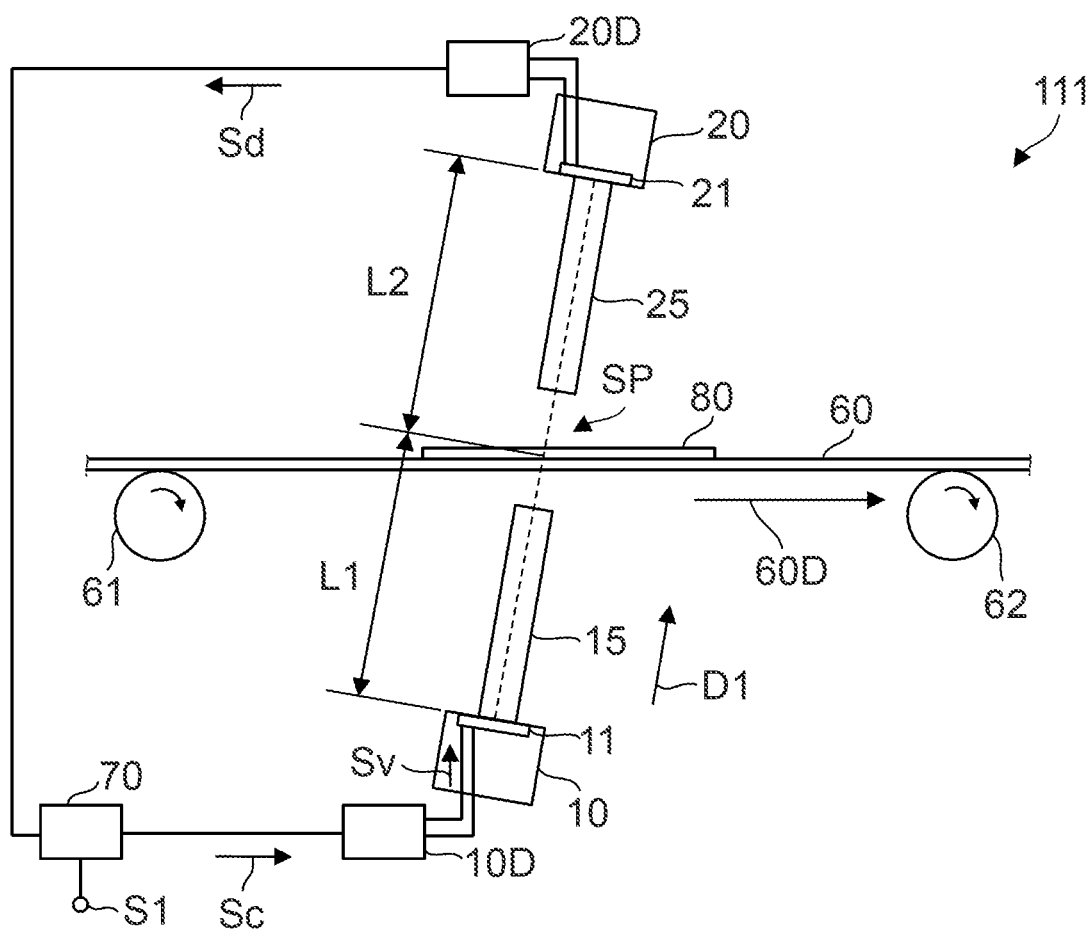
FIG. 4 is a schematic side view illustrating an inspection device according to the first embodiment.

FIG. 4 is a schematic side view illustrating an inspection device according to the first embodiment.

As shown in FIG. 4, the inspection device 111 according to the embodiment includes a first waveguide 15 and a second waveguide 25 in addition to the transmitter 10, the receiver 20, and the supporter 60. Otherwise, the configuration of the inspection device 111 may be similar to the configuration of the inspection device 110.

The first waveguide 15 is located between the transmitter 10 and the supporter 60. The first ultrasonic wave 10w passes through the first waveguide 15. For example, the first waveguide 15 guides the first ultrasonic wave 10w. The second waveguide 25 is located between the supporter 60 and the receiver 20. The first ultrasonic wave 10w passes through the second waveguide 25. For example, the second waveguide 25 guides the first ultrasonic wave 10w. The first ultrasonic wave 10w that passes through the second waveguide 25 is incident on the receiver 20.

For example, the first waveguide 15 is separated from the supporter 60. The second waveguide 25 is separated from the supporter 60. The supporter 60 can move between the first waveguide 15 and the second waveguide 25.

By providing the waveguides, the spreading of the first ultrasonic wave 10w can be suppressed. The detection sensitivity can be further increased.

Second Embodiment

Figure 5:
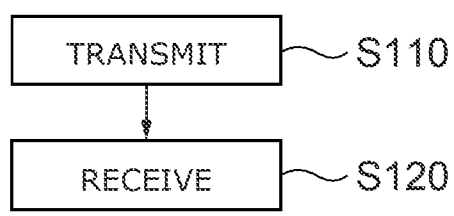
FIG. 5 is a flowchart illustrating an inspection method according to a second embodiment.

FIG. 5 is a flowchart illustrating an inspection method according to the second embodiment.

As shown in FIG. 5, the inspection method according to the embodiment includes transmitting, from the transmitter 10 (referring to FIG. 1, etc.) toward the inspection object 80, the first ultrasonic wave 10w that includes the multiple burst waves 10b having the first period Tp (step S110). The inspection method includes inspecting the inspection object 80 by using the receiver 20 (referring to FIG. 1, etc.) to receive the first ultrasonic wave 10w that passes through the inspection object 80 (step S120).

In the inspection method according to the embodiment, the first period Tp (s), the distance Dx (m), and the velocity vx (m/s) satisfy Formula (1) recited above. The distance Dx is the shorter distance of the first distance L1 and the second distance L2. The first distance L1 is the distance along the first direction D1 between the inspection object 80 and the transmitter 10; and the first direction D1 is from the transmitter 10 toward the receiver 20. The second distance L2 is the distance along the first direction D1 between the inspection object 80 and the receiver 20. The velocity vx is the propagation velocity of the first ultrasonic wave 10w in space between the transmitter 10 and the receiver 20. By such conditions, the effects of the reflected waves on the direct waves can be further suppressed. An inspection method can be provided in which the detection sensitivity can be increased.

According to the embodiment, it is more favorable for at least one of Formula (2) to Formula (7) recited above to be satisfied. The effects of the reflected waves on the direct waves can be further suppressed. An inspection method can be provided in which the detection sensitivity can be increased.

For example, in the inspection method according to the embodiment, an ultrasonic burst wave is transmitted at a prescribed period from an ultrasonic wave transmitter (the transmitter 10) to a receiver (the receiver 20). The inspection object 80 is inspected by detecting the output signal of the receiver. The period is less than the difference between the time of the direct wave directly reaching the receiver from the transmitter via the inspection object 80 and the time of the reflected wave initially reaching the receiver after the direct wave arrives from the transmitter. The period is greater than the pulse length of the burst wave. The reflected waves are in the temporal gaps between the multiple direct waves that directly reach the receiver.

Embodiments may include the following configurations (technological proposals).

Configuration 1

An inspection device, comprising:

a transmitter configured to transmit a first ultrasonic wave, the first ultrasonic wave including a plurality of burst waves having a first period Tp;

a receiver on which the first ultrasonic wave is incident, the receiver being configured to output a signal corresponding to the incident first ultrasonic wave; and a supporter provided between the transmitter and the receiver, the supporter being configured to support an inspection object, the first period Tp (s), a distance Dx (m), and a velocity vx (m/s) satisfying $$2Dx/((n+1)\cdot vx) < Tp < 2Dx/(n\cdot vx),$$

n being 1 or 2, the distance Dx being a shorter distance of a first distance and a second distance, the first distance being a distance along a first direction between the transmitter and the supporter, the first direction being from the transmitter toward the receiver, the second distance being a distance along the first direction between the supporter and the receiver, the velocity vx being a propagation velocity of the first ultrasonic wave in space between the transmitter and the receiver.

Configuration 2

The inspection device according to Configuration 1, wherein n is 1.

Configuration 3

The inspection device according to Configuration 1 or 2, wherein the transmitter includes a first membrane portion emitting the first ultrasonic wave, the first membrane portion is deformable, the first distance is a distance along the first direction between the first membrane portion and the supporter, the receiver includes a second membrane portion that is deformable by the received first ultrasonic wave, and the second distance is a distance along the first direction between the supporter and the second membrane portion.

Configuration 4

The inspection device according to any one of Configurations 1 to 3, wherein one of the plurality of burst waves has a first duration Tw, and the first period Tp (s), the distance Dx (m), the velocity vx (m/s), and the first duration Tw (s) satisfy $$Tw < (2Dx/vx - Tp) \times 2.$$

Configuration 5

The inspection device according to Configuration 4, wherein the first period Tp (s), the distance Dx (m), the velocity vx (m/s), and the first duration Tw (s) satisfy $$Tw < (2Tp - 2Dx/vx) \times 2.$$

Configuration 6

The inspection device according to Configuration 4 or 5, wherein the first period Tp (S), the distance Dx (m), the velocity vx (m/s), and the first duration Tw (s) satisfy $$Tw < (2Dx/vx - Tp) \times 4/3.$$

Configuration 7

The inspection device according to any one of Configurations 4 to 6, wherein
the first period Tp (s), the distance Dx (m), the velocity vx (m/s), and the first duration Tw (s) satisfy $$Tw<(2Tp-2Dx/vx)\times 4/3.$$

Configuration 8

The inspection device according to Configuration 4 or 5, wherein
the first period Tp (s), the distance Dx (m), the velocity vx (m/s), and the first duration Tw (s) satisfy $$Tw<(2Dx/vx-Tp).$$

Configuration 9

The inspection device according to Configuration 4 or 5, wherein
the first period Tp (s), the distance Dx (m), the velocity vx (m/s), and the first duration Tw (s) satisfy $$Tw<(2Tp-2Dx/vx).$$

Configuration 10

The inspection device according to any one of Configurations 1 to 9, further comprising:
a first waveguide provided between the transmitter and the supporter, the first ultrasonic wave passing through the first waveguide; and
a second waveguide provided between the supporter and the receiver,
the first ultrasonic wave passing through the second waveguide,
the first ultrasonic wave being incident on the receiver after passing through the second waveguide.

Configuration 11

The inspection device according to Configuration 10, wherein
the first waveguide is separated from the supporter, and
the second waveguide is separated from the supporter.

Configuration 12

An inspection method, comprising:
transmitting, from a transmitter toward an inspection object, a first ultrasonic wave including a plurality of burst waves having a first period Tp; and
inspecting the inspection object by using a receiver to receive the first ultrasonic wave after the first ultrasonic wave passes through the inspection object,
the first period Tp (s), a distance Dx (m), and a velocity vx (m/s) satisfying $$2Dx/((n+1)\cdot vx)<Tp<2Dx/(n\cdot vx),$$

n being 1 or 2,
the distance Dx being a shorter distance of a first distance and a second distance,
the first distance being a distance along a first direction between the inspection object and the transmitter,
the first direction being from the transmitter toward the receiver,
the second distance being a distance along the first direction between the inspection object and the receiver,
the velocity vx being a propagation velocity of the first ultrasonic wave in space between the transmitter and the receiver.

Configuration 13

The inspection method according to Configuration 12, wherein
n is 1.

Configuration 14

The inspection method according to Configuration 12 or 13, wherein
one of the plurality of burst waves has a first duration Tw, and
the first period Tp (s), the distance Dx (m), the velocity vx (m/s), and the first duration Tw (s) satisfy $$Tw<(2Dx/vx-Tp)\times 2.$$

Configuration 15

The inspection method according to Configuration 14, wherein the first period Tp (s), the distance Dx (m), the velocity vx (m/s), and the first duration Tw (s) satisfy $$Tw<(2Tp-2Dx/vx)\times 2.$$

Configuration 16

The inspection method according to Configuration 14 or 15, wherein
the first period Tp (s), the distance Dx (m), the velocity vx (m/s), and the first duration Tw (s) satisfy $$Tw<(2Dx/vx-Tp)\times 4/3.$$

Configuration 17

The inspection method according to any one of Configurations 14 to 16, wherein
the first period Tp (s), the distance Dx (m), the velocity vx (m/s), and the first duration Tw (s) satisfy $$Tw<(2Tp-2Dx/vx)\times 4/3.$$

Configuration 18

The inspection method according to Configuration 14 or 15, wherein
the first period Tp (s), the distance Dx (m), the velocity vx (m/s), and the first duration Tw (s) satisfy $$Tw<(2Dx/vx-Tp).$$

Configuration 19

The inspection method according to Configuration 14 or 15, wherein
the first period Tp (s), the distance Dx (m), the velocity vx (m/s), and the first duration Tw (s) satisfy $$Tw<(2Tp-2Dx/vx).$$

According to embodiments, an inspection device and an inspection method can be provided in which the detection sensitivity can be increased.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in inspection devices such as transmitters, receivers, supporters, transmitting circuits, receiving circuits, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all inspection devices, and inspection methods practicable by an appropriate design modification by one skilled in the art based on the inspection devices, and the inspection methods described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An inspection device, comprising:
a transmitter configured to transmit a first ultrasonic wave, the first ultrasonic wave including a plurality of burst waves having a first period Tp;
a receiver on which the first ultrasonic wave is incident, the receiver being configured to output a signal corresponding to the incident first ultrasonic wave; and
a supporter provided between the transmitter and the receiver,
the supporter being configured to support an inspection object,
the first period Tp (s), a distance Dx (m), and a velocity vx (m/s) satisfying
$2Dx/((n+1)\cdot vx) < Tp < 2Dx/(n \cdot vx)$, n having a same value on each side of the inequality,
n being 1 or 2,
the distance Dx being a shorter distance of a first distance and a second distance,
the first distance being a distance along a first direction between the transmitter and the supporter,
the first direction being from the transmitter toward the receiver,
the second distance being a distance along the first direction between the supporter and the receiver,
the velocity vx being a propagation velocity of the first ultrasonic wave in space between the transmitter and the receiver.

2. The device according to claim 1, wherein n is 1.

3. The device according to claim 1, wherein
the transmitter includes a first membrane portion emitting the first ultrasonic wave,
the first membrane portion is deformable,
the first distance is a distance along the first direction between the first membrane portion and the supporter,
the receiver includes a second membrane portion that is deformable by the received first ultrasonic wave, and
the second distance is a distance along the first direction between the supporter and the second membrane portion.

4. The device according to claim 1, wherein
one of the plurality of burst waves has a first duration Tw, and
the first period Tp (s), the distance Dx (m), the velocity vx (m/s), and the first duration Tw (s) satisfy $Tw < (2Dx/vx - Tp) \times 2$.

5. The device according to claim 4, wherein
the first period Tp (s), the distance Dx (m), the velocity vx (m/s), and the first duration Tw (s) satisfy $Tw < (2Tp - 2Dx/vx) \times 2$.

6. The device according to claim 4, wherein
the first period Tp (s), the distance Dx (m), the velocity vx (m/s), and the first duration Tw (s) satisfy $Tw < (2Dx/vx - Tp) \times 4/3$.

7. The device according to claim 4, wherein
the first period Tp (s), the distance Dx (m), the velocity vx (m/s), and the first duration Tw (s) satisfy $Tw < (2Tp - 2Dx/vx) \times 4/3$.

8. The device according to claim 4, wherein
the first period Tp (s), the distance Dx (m), the velocity vx (m/s), and the first duration Tw (s) satisfy $Tw < (2Dx/vx - Tp)$.

9. The device according to claim 4, wherein
the first period Tp (s), the distance Dx (m), the velocity vx (m/s), and the first duration Tw (s) satisfy $Tw < (2Tp - 2Dx/vx)$.

10. The device according to claim 1, further comprising:
a first waveguide provided between the transmitter and the supporter, the first ultrasonic wave passing through the first waveguide; and
a second waveguide provided between the supporter and the receiver,
the first ultrasonic wave passing through the second waveguide,
the first ultrasonic wave being incident on the receiver after passing through the second waveguide.

11. The inspection device according to claim 10, wherein
the first waveguide is separated from the supporter, and
the second waveguide is separated from the supporter.

12. An inspection method, comprising:
transmitting, from a transmitter toward an inspection object, a first ultrasonic wave including a plurality of burst waves having a first period Tp; and
inspecting the inspection object by using a receiver to receive the first ultrasonic wave after the first ultrasonic wave passes through the inspection object,
the first period Tp (s), a distance Dx (m), and a velocity vx (m/s) satisfying $2Dx/((n+1)\cdot vx) < Tp < 2Dx/(n \cdot vx)$, n having a same value on each side of the inequality,
n being 1 or 2,
the distance Dx being a shorter distance of a first distance and a second distance,
the first distance being a distance along a first direction between the inspection object and the transmitter,
the first direction being from the transmitter toward the receiver,
the second distance being a distance along the first direction between the inspection object and the receiver,
the velocity vx being a propagation velocity of the first ultrasonic wave in space between the transmitter and the receiver.

13. The method according to claim 12, wherein n is 1.

14. The method according to claim 12, wherein
one of the plurality of burst waves has a first duration Tw, and
the first period Tp (s), the distance Dx (m), the velocity vx (m/s), and the first duration Tw (s) satisfy $Tw < (2Dx/vx - Tp) \times 2$.

15. The method according to claim 14, wherein the first period Tp (s), the distance Dx (m), the velocity vx (m/s), and the first duration Tw (s) satisfy $$Tw < (2Tp - 2Dx/vx) \times 2.$$

16. The method according to claim 14, wherein the first period Tp (s), the distance Dx (m), the velocity vx (m/s), and the first duration Tw (s) satisfy $$Tw < (2Dx/vx - Tp) \times 4/3.$$

17. The method according to claim 14, wherein the first period Tp (s), the distance Dx (m), the velocity vx (m/s), and the first duration Tw (s) satisfy $$Tw < (2Tp - 2Dx/vx) \times 4/3.$$

18. The method according to claim 14, wherein the first period Tp (s), the distance Dx (m), the velocity vx (m/s), and the first duration Tw (s) satisfy $$Tw < (2Dx/vx - Tp).$$

19. The method according to claim 14, wherein the first period Tp (s), the distance Dx (m), the velocity vx (m/s), and the first duration Tw (s) satisfy $$Tw < (2Tp - 2Dx/vx).$$

* * * * *